(12) United States Patent
Wu

(10) Patent No.: US 12,341,554 B2
(45) Date of Patent: Jun. 24, 2025

(54) JITTER MEASUREMENT OF THE MULTI-LEVEL PAM EYE DIAGRAM

(71) Applicant: Donghong Wu, Union City, CA (US)

(72) Inventor: Donghong Wu, Union City, CA (US)

( * ) Notice: Subject to any disclaimer, the term of this patent is extended or adjusted under 35 U.S.C. 154(b) by 239 days.

(21) Appl. No.: 18/146,876

(22) Filed: Dec. 27, 2022

(65) Prior Publication Data
US 2024/0214063 A1 Jun. 27, 2024

(51) Int. Cl.
*H04B 10/07* (2013.01)
*G06T 11/00* (2006.01)
*G06T 11/60* (2006.01)
*H04B 10/077* (2013.01)

(52) U.S. Cl.
CPC ........ *H04B 10/0775* (2013.01); *G06T 11/001* (2013.01); *G06T 11/60* (2013.01); *G06T 2210/22* (2013.01)

(58) Field of Classification Search
CPC .................................. H04B 10/0775
See application file for complete search history.

(56) References Cited

U.S. PATENT DOCUMENTS

| | | | |
|---|---|---|---|
| 2022/0302942 A1* | 9/2022 | Shahramian | H04B 1/1607 |
| 2023/0054834 A1* | 2/2023 | Manjunath | H04L 25/4917 |

OTHER PUBLICATIONS

Stephens, "Jitter 360°/Jitter from Every Angle", Tektronix, Sep. 2008 (Year: 2008).*
Stephens, "Jitter 360°", Tektronix, 2006 (Year: 2006).*

* cited by examiner

*Primary Examiner* — Shi K Li

(57) ABSTRACT

A method for measuring litter in multi-level Pulse Amplitude Modulation (PAMn) eye diagrams, employing one-way analysis of variance (ANOVA) and image processing techniques. The procedure begins by importing a photo or digital file of a PAMn eye diagram and editing it to form a one Unit Interval (1UI) PAMn pattern. It proceeds by acquiring vertical histograms along the amplitude axis for both the horizontal lane (hlane) at the middle of a level and mixed lanes at one end of the PAMn pattern. Gaussian fits are then applied to these histograms to ascertain jitter characteristics. The key fitting parameters, including the hlane mean, the level mean, and their mean shift, are used to determine Deterministic Jitter (DJ), while the widths of the hlane and level contribute to the assessment of Random Jitter (RJ). This method provides a detailed and advanced evaluation of litter characteristics essential for high-speed serial communication systems.

3 Claims, 7 Drawing Sheets

JITTER MEASUREMENT OF THE MULTI-LEVEL PAM EYE DIAGRAM

FIELD OF TECHNOLOGY

This invention generally relates to a system for jitter analysis of the serial signals and more specifically for jitter measurement of the multi-level Pulse-amplitude modulation (PAMn) eye diagrams in high-speed serial communication systems.

BACKGROUND OF THE INVENTION

Multi-level Pulse Amplitude Modulation (PAMn) [1], also known as serial communication, is a basic form of signal modulation in fiber optic communication. In serial communication, data information is encoded as a series of signal pulse amplitudes sent by the transmitter and then detected and decoded by the receiver at the far end. Traditional binary non-return-to-zero (NRZ) modulation in optical serial communications has two power levels representing a logic 0 and a logic 1, often referred to as PAM2. Its disadvantage is a higher channel-dependent loss as the modulation rate increases. Therefore, adding multiple levels in the modulation signals has become a more feasible solution in high-speed serial communication. The PAM4 signaling is the earliest industry standard among them, doubling the bandwidth as NRZ for the same data rate. Although the optical transceivers based on PAM4 have been widely used in the optical network, there are some critical manufacturing issues in the characterization, testing, and calibration of PAM4 signaling.

Jitter measurement of the eye diagram is one of the challenges. The eye diagram is an image on a digital sampling oscilloscope [2], rearranging and superimposing the serial communication signals according to the modulation cycle intervals. When the signal width of the time scale on the scope is the two interval units (2UI), the NRZ eye diagram displays an eye pattern, while a PAM4 eye diagram may display three eye patterns from high to low. Compared with the NRZ eye diagram, PAM4 may have a significant distortion and noise, which leads to the reduction of signal-to-noise ratio and the increase of test complexity. Jitter analysis of the eye diagram is essential testing in high-speed serial communications because jitter levels and degraded waveforms significantly affect signal quality in communication networks. In jitter analysis, total jitter (TJ) is divided into two components, deterministic jitter (DJ) and random jitter (RJ). Deterministic jitter is a bounded jitter that is predictable and repeatable. Random jitter, called Gaussian jitter, is the unbounded jitter part of TJ. Both deterministic jitter and random jitter can be further classified by mechanisms.

In the existing solutions, the jitter analysis of the NRZ (PAM2) eye diagram measures the time variances of the rising and falling edges of the eye diagram at the crossing point of the eye. One can directly measure a peak-to-peak jitter and a random jitter from the horizontal pixel histogram at the eye cross point. A dual-Dirac jitter model was successfully used for estimating total jitter defined at a bit error ratio, TJ(BER), along the horizontal or time axis of the NRZ eye diagram. However, the jitter testing method cannot apply to the PAMn (n>2) eye diagrams due to the complex structures of the multiple crossing points along the time axis on the PAMn eye diagram.

Transmitter dispersion eye closure quaternary (TDECQ), as a measure of the vertical eye closure of the optical transmitter, is the first test solution about the signal distribution on the vertical central axis of the PAM4 eye diagram. During the test, the TDECQ system can improve the eye quality through continuous measurement of the parameter, feedback, and adjustment with hardware components, such as a multi-tap sensor and a feed-forward equalizer, in the oscilloscope. However, one can only get limited information from the TDECQ testing. For example, the system in scope adjusts all three eyes on the PAM4 eye diagram simultaneously but cannot measure and analyze the specific eye to be concerned. The TDECQ parameter is a measure of the reshaped eye diagram after a series of adjusting processes, so the testing result is only the relative value of the initial state of a device under test (DUT). In addition, one cannot establish a relationship between the TDECQ parameter and the jitter analysis of the PAM4 signals.

In the present disclosure, one-way analysis of variance (ANOVA) in statistics is used for the jitter measurement of the mixed-lane signals in the PAMn eye diagram. Variances or jitter, the squares of the standard deviations, are a measure of dispersion in statistics. One-Way ANOVA is a technique to determine sample variances by comparing means of multiple samples. One may determine three components of jitter, RJ, DJ, and TJ of the mixed-lane signals in the concentrated layer on the PAMn eye diagram with the mathematical formulas of the partition of sums of squares in ANOVA. The statistical model reveals a general algorithm and the test parameters used for the jitter analysis of the PAMn signals. The concentrated layers at the vertical center on the PAMn eye diagram are mixed signals from the different transition lanes. Because each lane signal consists of massive mini dots, one may only recognize the central line of a transition lane and its blurred contours on the image, so identifying the components of RJ, DJ, and TJ in the PAMn eye diagram becomes challenging. In the present invention, a novel jitter measurement method of the mixed-lane signals on the PAMn eye diagram is disclosed, implementing the partition of sums of squares in ANOVA and image processing methods.

BRIEF DESCRIPTION OF DRAWINGS

The present invention is illustrated by way of example, and not by way of limitation, in the figures of the accompanying drawings and in which reference numerals refer to similar elements.

The following terms may be used with reference to the figures and description set forth herein. A 1UI may be one unit interval on the x scale of an oscilloscope. A PAMn eye diagram may be an image with 2UI or more in the x scale. A transition lane or lane on the 1UI PAMn image may be an imaging band comprising many image dots from the same transition process from a Start state to an End state (Start End). A mixed-lane or level may be a concentrated layer on the PAMn eye diagram, labeled with the logic coding state from zero to n−1, n is the multi-level. A hlane may be a horizontal lane with the same start and end levels on the 1UI PAMn image. A tlane may be a transition lane with different start and end levels on the 1UI PAMn image. For instance, 00 is the horizontal lane with the same start and end levels, and 30 is the transition lane from level 3 to level 0 on the 1UI PAMn image. A hlane [3] signal may be a horizontal lane [4] signal sampled in the middle of a level, and a level signal may be a mixed lane signal sampled at either side of a level. A hlane [3] histogram may be a vertical pixel profile of the hlane [3] signal at the sampling point, and a level histogram may be a vertical pixel profile of the level signal at the sampling point.

DETAILED DESCRIPTION OF THE INVENTION

Embodiments of methods for jitter measurement for the PAMn eye diagram are described herein. In the following description, some specific details are set forth to provide a thorough understanding of the embodiments of the invention. The particular models, algorithms, and process logic flows in the invention can be combined in any suitable manner into one or more embodiments.

Unlike the 2UI scale in the PAMn eye diagram, the novel jitter measurement method in the present disclosure uses the 1UI scale in the PAMn image for the statistical model of jitter analysis. The 1UI model simplifies the complexity of the PAMn signals and reduces the number of the transition lanes analyzed to half. Notably, the new model allows one to focus the jitter analysis to [9] two particular signal areas on the level, the single-lane or hlane [3] signal and the mixed-lane or level signal, resulting in the identification of the jitter components, RJ and DJ.

Figure 1:
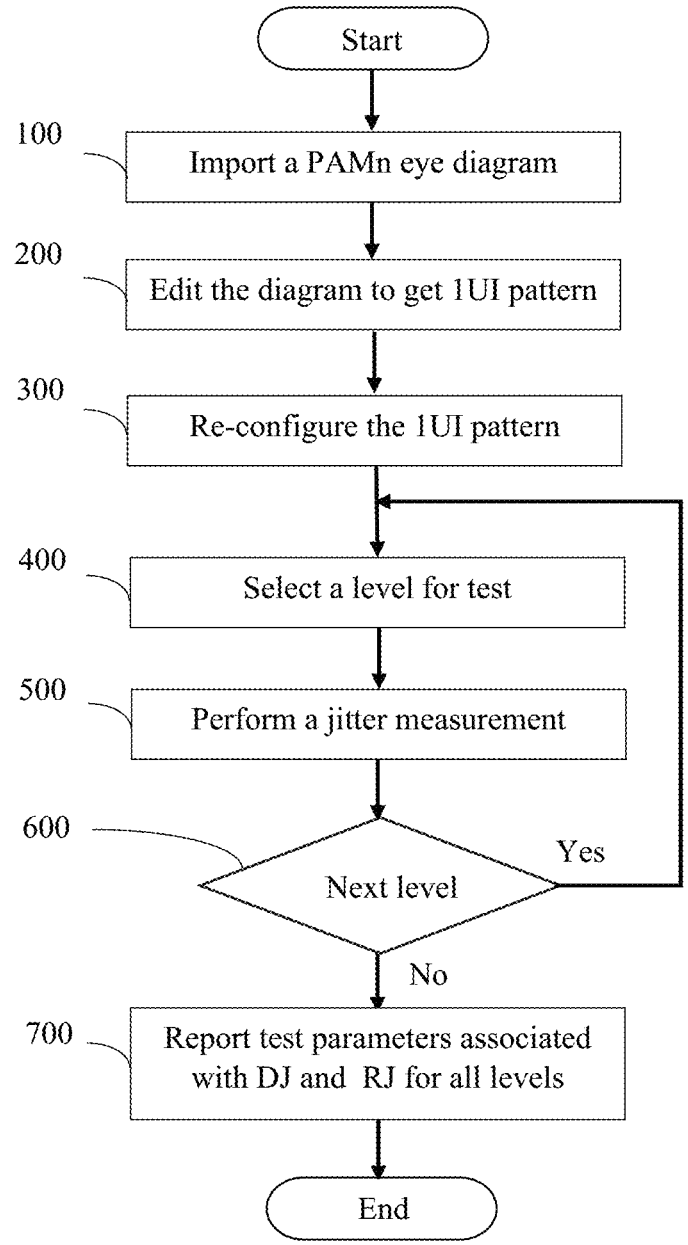
FIG. 1 illustrates a flow chart of an exemplary method for jitter measurement of the PAMn eye diagram with the partition of sums of squares in ANOVA and image process method, in accordance with an embodiment of the present invention.

FIG. 1 illustrates a flowchart of an exemplary method for jitter measurement of the PAMn eye diagram, in accordance with an embodiment of the present invention. The method initiates with Step 100, where a photo or digital file of a multi-level Pulse Amplitude Modulation (PAM-n) eye diagram is imported from a digital sampling oscilloscope or a compatible device. This initial step is crucial as it prepares the diagram for subsequent editing and detailed analysis. In Step 200, the PAM-n eye diagram undergoes transformation from a 2UI or multiple UI configuration into a streamlined 1UI PAM-n pattern. This editing utilizes precise image processing techniques; the complete process will be further detailed in the dependent claim 2. Following the transformation, Step 300 involves reconfiguring the pixel size and scale of the 1UI pattern to optimize it for accurate jitter measurements, ensuring that the diagram's dimensions and resolution are ideally suited for subsequent analysis. Step 400 consists of selecting the testing level, setting the stage for jitter measurements, which are performed in Step 500. During this step, sampling points for the hlane and level signals are selected, histograms are acquired, and Gaussian distributions are fitted to determine specific jitter parameters. These measurement techniques will be elaborated upon in the dependent claim 3. The method culminates in Step 700, where the jitter testing parameters are reported. This final step includes detailing the means, mean shifts, and standard deviations associated with both deterministic and random jitter, thereby providing a comprehensive assessment of Total Jitter (TJ) across the PAM-n level histograms [10].

Figure 2:
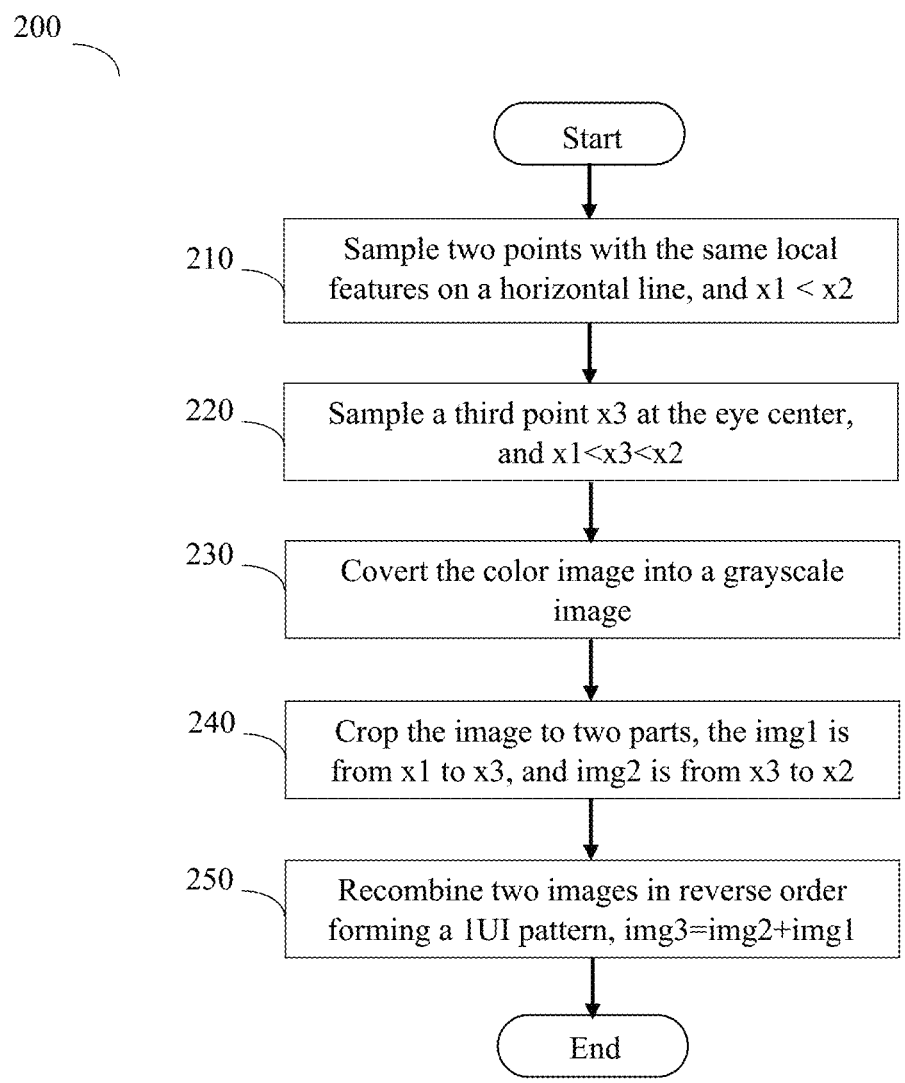
FIG. 2 illustrates a flow chart of an exemplary method for editing a PAMn eye diagram to a 1UI PAM4 pattern [5], in accordance with an embodiment of the present invention.

FIG. 2 illustrates a flow chart of an exemplary method for modifying a PAMn eye diagram to a 1UI PAMn image, in accordance with an embodiment of the present invention. In a step 210 of method 200, two sampling points, (x1, y1) and (x2, y2), may be taken at a horizontal line on the eye diagram where the two sampling points have the same local features and y1=y2. The third sampling point (x3, y3) between x1 and x2, the expected vertical edge of the 1UI PAMn image, may be taken in a step 220 of method 200. The image processing method may convert the color PAMn eye diagram to a [11] gray image in a step 230 of method 200, and then crop the 2UI diagram into two images, where img1 is from x1 to x3, and img2 is from x3 to x2 in a step 240 of method 200. Finally, the image processing method may concatenate two images in the reverse order, img3=img2+img1, in a step 250 [12] of method 200, to obtain a new PAMn image with the 1UI image width.

Figure 3:
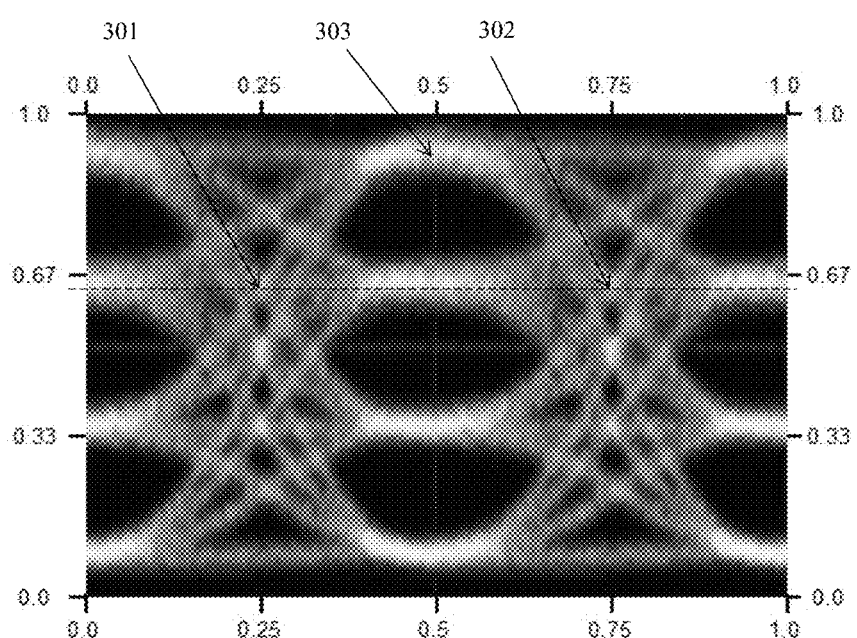
FIG. 3 illustrates an example of sampling three points on a PAMn eye diagram to obtain a 1UI PAMn image.

FIG. 3 illustrates an example of sampling three points on a PAM4 eye diagram to obtain a 1UI PAM4 image. To get the new image with a 1UI width, one may sample two points with the same local texture structures at a horizontal line in the eye diagram, 301 and 302, for example. The third sampling point, 303, is to set the edge position of the 1UI PAM4 image or the center position of the 2UI PAM4 eye diagram. Once the three sampling points are selected, the system may modify the PAM4 eye diagram with the image processing method in method 200 to get a PAMn image with a 1UI image width and the user-defined edge position of the 1UI image.

Figure 4:
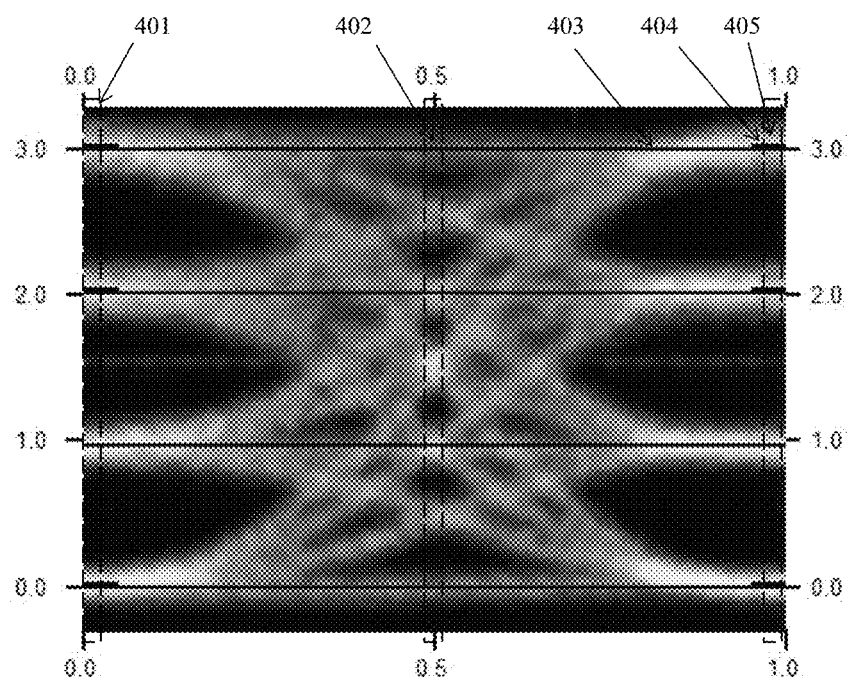
FIG. 4 illustrates an example of sampling the hlane [3] signal and the level signal on a 1UI PAM4 image.

FIG. 4 illustrates an example of sampling the hlane [3] signal and the level signal of a 1UI PAM4 image. The hlane [3] signal may be sampled in the middle 402 of a level in the 1UI PAM4 image. There are two types of texture structures in the hlane [3] signal area. One is the hlane [3] signal at the top level 3 or the bottom level 0 where no transition lanes (tlanes) intersect, resulting in a vertical histogram at the sampling area against a clean background [13]. Another type pertains to lane signals at other levels where a hlane intersects with other inter-level transition lanes [14] in the center area of the 1UI PAM4 image. Here, the sampling process may involve selecting the brightest point within the local area and setting threshold nearby for background removal [15]. The level signal may be sampled near one [16] ends of level 401 or 405, where the level histogram is the mixed signals of the multiple transition lanes that share either the same start or end state [17]. After acquiring the vertical pixel histogram at a sampling point, the system apply Gaussian fitting to the histogram to determine the mean and standard deviation [18] of the signal. In the 1UI statistical model, the hlane [3] signal of a level may remain constant so that the hlane [3] mean 403 is drawn as a horizontal line through the 1UI image. On the other hand, the level mean may change varies depending on the proximity to the end of a level, resulting in only two short line segments being depicted for the level mean, as shown [19] in 404, for example.

Figure 5:
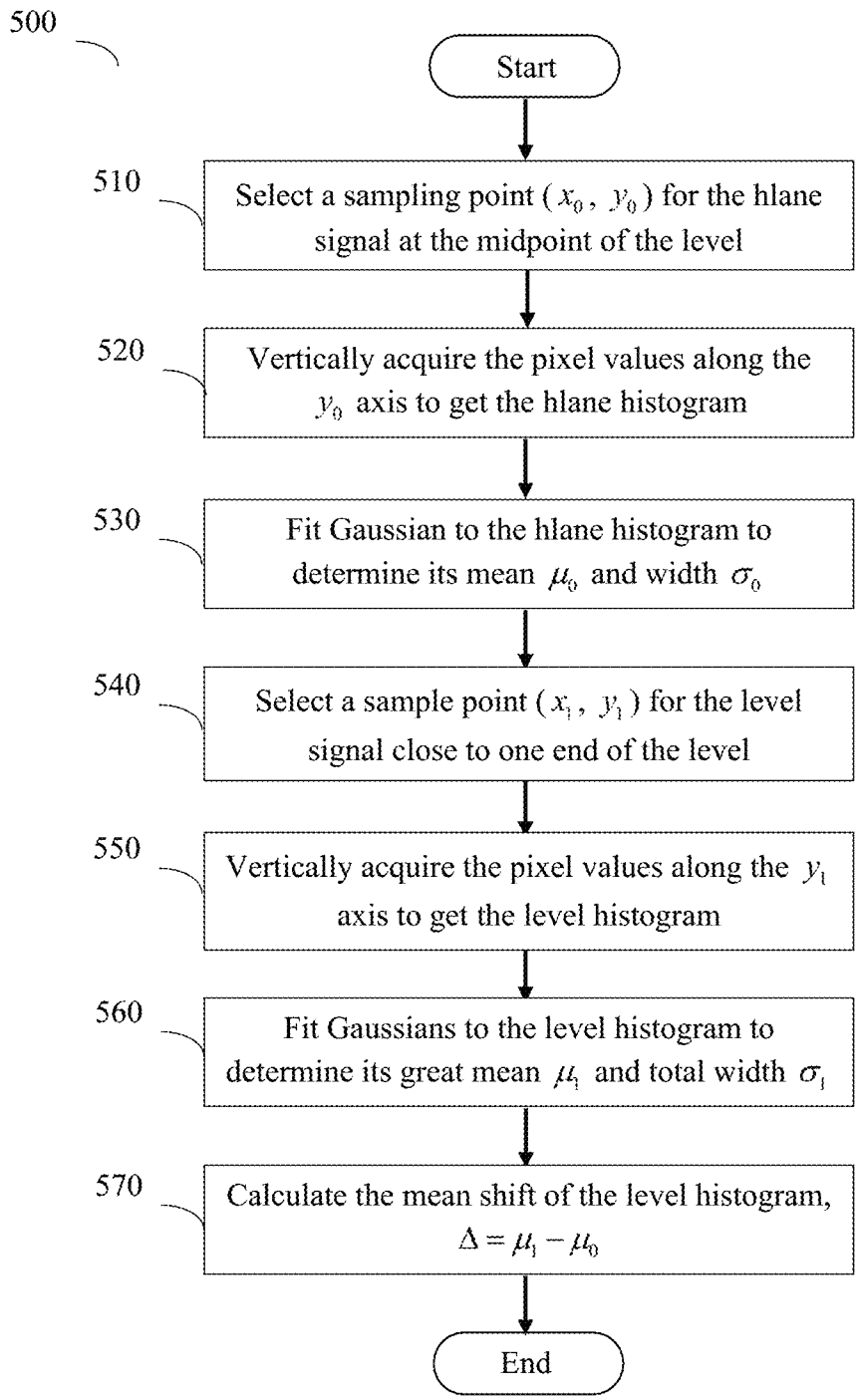
FIG. 5 illustrates a flow chart of an exemplary method for performing jitter measurement within the 1UI PAMn pattern [6], in accordance with an embodiment of the present invention.

FIG. 5 illustrates a flow chart of an exemplary method for jitter measurement of a level histogram on the 1UI PAMn image, in accordance with an embodiment of the present invention. The process begins at Step 510 of Method 500 by selecting a sampling point for the horizontal lane (hlane) signal, strategically located at the midpoint of the level within the 1UI PAM-n pattern. This initial step is critical as it sets the reference point for measuring the inherent jitter in the level's signal. Following this, in Step 520, pixel values are acquired along the vertical axis at the chosen sampling point to construct the hlane histogram. This histogram captures the distribution of pixel intensity values across the hlane, providing a fundamental dataset for further statistical analysis. The hlane histogram is then subjected to Gaussian fitting in Step 530, which facilitates the determination of its mean ($\mu_0$) and standard deviation ($\sigma_0$), offering insights into the variability of the hlane signal. Subsequently, in Step 540, a sampling point for the level signal is selected, typically positioned close to one end of the level. This choice is aimed at capturing the variations in the level signal along the central axis of the open eyes against a clean background, which is essential for a comprehensive jitter assessment. At this new sampling point, pixel values along the vertical axis are collected to form the level histogram in Step 550. This histogram is instrumental for comparative analysis against the hlane histogram and serves as the basis for quantifying the level's jitter characteristics. In Step 560, Gaussian distributions are fitted to the level histogram, allowing for the precise calculation of its mean ($\mu$) and standard deviation ($\sigma$). These metrics are critical for understanding the distribution and central tendency of the level's jitter. The process concludes in Step 570 by calculating the mean shift ($\Delta$) of the level histogram, defined as the difference between the means of the level histogram ($\mu$) and the hlane histogram ($\mu_0$). This calculation quantifies the deterministic jitter (DJ) of the level histogram, encapsulating the extent to which the level's mean deviates from the hlane mean due to systematic variations in the signal, thus providing a comprehensive measure of jitter within the PAM-n system [20].

Figure 6:
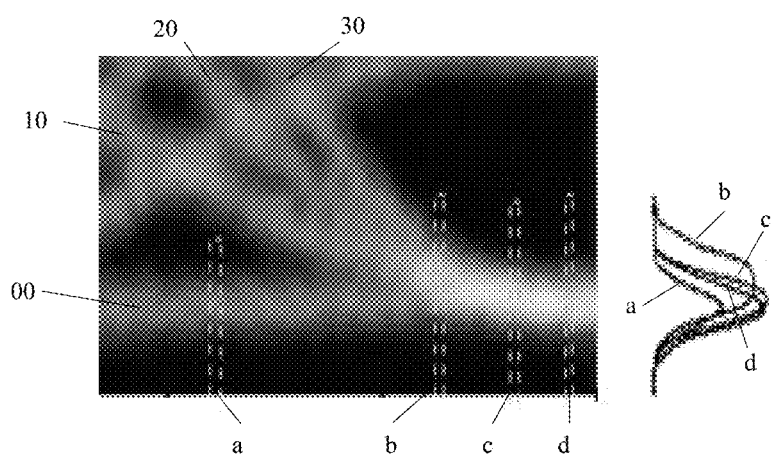
FIG. 6 illustrates an example of evaluating the mean shift across different sampling positions within a level histogram, crucial for detailed analysis of deterministic jitter (DJ) characteristics [7]

FIG. 6 presents a corner image of the 1UI PAM4 pattern, specifically targeting the lower right corner to showcase the mean shift across different sampling positions within a level histogram, a crucial aspect in the analysis of deterministic jitter (DJ). This particular segment of the 1UI PAM4 pattern features four transition lanes: a horizontal lane (hlane 00) and three inter-level transition lanes (tlane 10, 20, and 30). Directly to the right of the image, four histograms labeled a, b, c, and d correlate to vertical slots within the image. Histogram a only captures the hlane signal, while histograms b, c, and d represent the level signals, which are combinations of the four transition lanes. This configuration illustrates how the trends in the level histograms tend to converge with or closely align with the hlane mean towards the ends of the level, highlighting the dynamic interaction between these signal components [21].

The Disclosed Algorithm

The algorithm disclosed herein is based on recognizing factors.

1. A level histogram in the 1UI PAM-n image can be viewed as a mixed system where each transition lane is treated as an independent component exhibiting approximately Gaussian distributions. In this analytical context, the three primary jitter components—Random Jitter (RJ), Deterministic Jitter (DJ), and Total Jitter (TJ)—can be accurately quantified using mathematical formulas derived from the partitioning of sums of squares in one-way ANOVA. Specifically, RJ is calculated as the sum of squares within groups (or Error), DJ as the sum of squares between groups (or Treatment), and TJ as the total sum of squares. This structured analytical framework aids in dissecting the variations both within and between the levels of the histogram, thereby providing a detailed and comprehensive measure of jitter [22].

2. A level histogram captures the signals from all transition lanes at a specific sampling point within a level. The mean and width of this histogram vary significantly with the location of the sampling point. In a 1UI PAMn pattern, the width of the level histogram typically reaches its minimum near one end of the level, as illustrated in FIG. 6. This approach mirrors the conventional technique used for sampling the horizontal histogram at its minimal crossing point in the NRZ eye diagram, a method essential for precise jitter analysis of NRZ eye diagrams [23].

3. The random jitter RJ of a level may be measured with a standard deviation or width 6 of the level histogram, which is consistence with RJ measurement of the NRZ eye diagram.

4. Total jitter (TJ) is the sum of random jitter (RJ) and deterministic jitter (DJ), defined by the equation TJ=RJ+DJ, with DJ being non-negative (DJ≥0). In scenarios where there is no Intersymbol Interference (ISI) and other dispersions, such as when all transition lanes, including a horizontal lane (hlane) and other transition lanes (tlanes), symmetrically overlap around the level mean within the level histogram, DJ equals zero (DJ=0). Consequently, TJ is equal to RJ, representing the minimum possible value of TJ [24].

In the 1UI PAM-n pattern, the horizontal lane mean ($\mu_0$) typically remains constant, indicating that it does not vary based on the sampling point along the level. Therefore, the hlane mean ($\mu_0$) functions as a reference line for measuring the mean shift ($\Delta$) from the level mean ($\mu$). This mean shift, $\Delta$, is significant as it is independent of the random jitter within the mixed-signal system, and is solely associated with deterministic jitter. Consequently, the mean shift ($\Delta$) is employed as a key metric to quantify DJ [25]. The jitter measurement method described in this invention utilizes five key testing parameters. These include three parameters related to deterministic jitter, the hlane mean, the level mean, and the mean shift, and two parameters associated with random jitter, the hlane width and the level width, depicted in the FIG. 7. This comprehensive methodology provides effective insights into evaluating the impact of both deterministic factors and random jitter on total jitter. By systematically integrating these parameters, this approach significantly enhances the clarity and precision of jitter analysis within the PAMn eye diagram, offering a novel methodology to study and comprehend the complex dynamics affecting signal integrity for high-speed serial communication systems [26].

The system, which integrates the statistical model, algorithm, and image processing method, represents a versatile solution for jitter measurement in amplitude-modulated signaling across various frequencies and baud rates [27].

Reason for Modifications:

[1] Original: Pulse Amplitude Modulation (PAM)
Modified: Multi-level Pulse Amplitude Modulation (PAMn)
Reason for Modification: To more precisely define the scope of the technology being discussed. This modification ensures that the terminology aligns with the advanced methods employed in the invention, specifically highlighting its capability to handle a range of amplitude levels beyond the binary PAM2 and quaternary PAM4. Such specificity is crucial for accurately representing the invention's applicability to diverse communication systems and applications as intended by the patent.

[2] Original: high-speed digital oscilloscope
Modified: digital sampling oscilloscope
Reason for Modification: To more accurately reflect the specific type of oscilloscope utilized in the method. This change is essential as it underscores the oscilloscope's capability to precisely sample signals, a critical requirement for the detailed analysis outlined in this patent. By making this modification, we enhance the technical precision and ensure better alignment with the functionalities described within the specification, thereby clarifying the equipment's role and capabilities in the context of the invention.

[3] Original: lane
Modified: hlane
Reason for Modification: To ensures uniformity and clarity throughout the specification, reinforcing the precise identification of the lane's orientation crucial for understanding the system's architecture and operations. This consistent terminology aligns with the technical descriptions and enhances the readability and accuracy of the patent application.

[4] Original: single lane
Modified: horizontal lane
Reason for Modification: To improve clarity by distinctly identifying the orientation and type of lanes discussed, which is essential for accurately describing the architectural and operational aspects of the system within the patent. This change ensures that the description is precise and aligns with the technical details of the invention, facilitating a clearer understanding of the patent's scope and functionality.

[5] Original: obtain the 1UI PAM4 image
Modified: a 1UI PAMn pattern
Reason for Modification: To streamline the phrase and enhance the precision of the description. This modification removes unnecessary verbiage and clarifies the direct transformation involved in the editing process, thereby simplifying the text while accurately describing the procedural action within the specification.

[6] Original: jitter measurement of a level histogram on the 1UI PAMn image
Modified: performing jitter measurement within the 1UI PAMn pattern
Reason for Modification: To streamline the language and enhance the precision of the description. This modification removes unnecessary verbiage and clarifies the direct transformation in the process, thereby simplifying the text while accurately describing the procedural action within the specification and aligning the corresponding dependent claim.

[7] Original: explaining the algorithm using the partition of sums of squares in ANOVA to determine the jitter components, RJ, DJ, and TJ of a level histogram
Modified: evaluating the mean shift across different sampling positions within a level histogram, crucial for detailed analysis of deterministic jitter (DJ) characteristics
Reason for Modification: To focus more specifically on the practical application of the method in analyzing deterministic jitter. This change shifts the description from a broad, technical explanation of the statistical methodology to a more targeted and application-oriented description that emphasizes the practical steps taken to analyze DJ characteristics within a level histogram. This enhances the readability and relevance of the text to the specific techniques employed in the patent, making the description more accessible and directly tied to the operational details of the invention.

[8] Original: reporting jitter measurements of four levels in a PAM4 image
Modified: reporting the jitter testing parameters, including the mean and mean shift associated with Deterministic Jitter (DJ), the standard deviation corresponding to Random Jitter (RJ)
Reason for Modification: To enhance the specificity and detail in the description of the reporting process. This modification clarifies exactly what aspects of jitter are being measured and reported, explicitly highlighting the inclusion of both deterministic and random jitter components. By detailing the parameters such as mean, mean shift, and standard deviation, the revised phrase provides a clearer and more comprehensive understanding of the jitter analysis process, aligning better with the technical depth of the patent documentation.

[9] Original: of the 1UI PAMn image on a concentrated layer or level and two particular signal areas
Modified: to two particular signal areas
Reason for Modification: To streamline the description, align the dependent claim, and enhance clarity. This modification eliminates the redundant mention of 'concentrated layer or level,' focusing directly on the specific signal areas of interest, providing a more precise and technically accurate description of the jitter analysis process in the context of the patent.

[10] Original: FIG. 1 illustrates a flow chart of an exemplary method for jitter measurement of the PAMn eye diagram with the partition of sums of squares in ANOVA and image process method, in accordance with an embodiment of the present invention. A software system that integrates the jitter analysis model, algorithms, and image process method is used to perform the jitter measurement of the PAMn eye diagram. First, a color photo or a digital file of the PAMn eye diagram in a 2UI scale or more, taken from the oscilloscope screen, is imported into the system 100. Secondly, with the image processing method, the PAMn eye diagram is edited to a 1UI PAMn image 200. Next, the 1UI image may be further configured in color, size, and scales for jitter measurement 300. After that, the system may perform a jitter measurement in a sequence of procedures based on the partition of sums of squares in ANOVA and the image processing method to determine the jitter components of the level histogram 500. Finally, the jitter components, RJ, DJ, and TJ of all levels in the PAMn image may be reported after completing jitter measurements of all levels 700.
Modified: FIG. 1 illustrates a flowchart of an exemplary method for jitter measurement of the PAMn eye diagram, in accordance with an embodiment of the present invention. The method initiates with Step 100, where a photo or digital file of a multi-level Pulse Amplitude Modulation (PAM-n) eye diagram is imported from a digital sampling oscilloscope or a compatible device. This initial step is crucial as it prepares the diagram for subsequent editing and detailed analysis. In Step 200, the PAM-n eye diagram undergoes transformation from a 2UI or multiple UI configuration into a streamlined 1UI PAM-n pattern. This editing utilizes precise image processing techniques; the complete process will be further detailed in the dependent claim 2. Following the transformation, Step 300 involves reconfiguring the pixel size and scale of the 1UI pattern to optimize it for accurate jitter measurements, ensuring that the diagram's dimensions and resolution are ideally suited for subsequent analysis. Step 400 consists of selecting the testing level, setting the stage for jitter measurements, which are performed in Step 500. During this step, sampling points for the hlane and level signals are selected, histograms are acquired, and Gaussian distributions are fitted to determine specific jitter parameters. These measurement techniques will be elaborated upon in the dependent claim 3. The method culminates in Step 700, where the jitter testing parameters are reported. This final step includes detailing the means, mean shifts, and standard deviations associated with both deterministic and random jitter, thereby providing a comprehensive assessment of Total Jitter (TJ) across the PAM-n level histograms.

Reason for Modification: To enhance clarity and streamline the flow of information regarding the jitter measurement method, making the process easier to understand and follow. These revisions align with the detailed updates specified in Claim 1, which clearly defines the method steps from importing the PAMn eye diagram to reporting jitter testing parameters. This alignment between the specification and the claims is crucial for maintaining consistency throughout the document, ensuring that all descriptions support the legally defined scope of the invention as outlined in the claims. The revised paragraph eliminates unnecessary technical jargon and restructures the content to highlight the sequential steps involved, thus improving readability and accessibility. Additionally, by ensuring the specification directly corresponds with the methodological details in Claim 1, the modification strengthens the patent application, helping to prevent ambiguities and enhance the patent's examination process. This strategic alignment and clarification not only make the document more concise but also enhance its instructional quality, supporting a clearer understanding of the invention's technical and legal boundaries.

[11] Original: monochromatic or gray
Modified: or gray
Reason for Modification: To clarify that the conversion process specifically targets a grayscale format, eliminating any ambiguity regarding the type of image processing involved. This precision is crucial for accurately detailing the method steps in the patent document and ensuring that the described techniques are clearly understood and reproducible.

[12] Original: 240
Modified: 250
Reason for Modification: To correct an error in the original text where the wrong step number was cited. This change ensures that the description accurately references the correct procedural step in the flowchart associated with the method being described. Aligning the text with the appropriate step number enhances the accuracy and reliability of the document, facilitating a clearer and more precise understanding of the sequence of operations involved in the method.

[13] Original: in that no other transition lanes are crossing, so the vertical histogram at the sample point may only contain a single lane signal
Modified: where no transition lanes (tlanes) intersect, resulting in a vertical histogram at the sampling area against a clean background
Reason for Modification: To enhance the clarity and precision of the language used in the specification. The revision more precisely describes the outcome of having no intersecting transition lanes. This change clarifies the expected result of the measurement process, ensuring that the description is both technically accurate and easier to understand for readers. This improvement directly supports the detailed explanation of the invention's operation and facilitates a clearer understanding of the underlying technology.

[14] Original: Another type is the lane signals of other levels in that a hlane intersects with some tlanes
Modified: pertains to lane signals at other levels where a hlane intersects with other inter-level transition lanes
Reason for Modification: To improve the precision and readability of the specification. The updated language clarifies that "hlane" (horizontal lane) interactions occur specifically with "inter-level transition lanes," rather than generically with "tlanes," which might ambiguously refer to any transition lanes within the same level or between levels. By specifying "inter-level transition lanes," the modification more accurately defines the context and nature of these intersections, highlighting the complexity and specificity of interactions in multi-level signal systems. This refinement helps to eliminate ambiguity, ensuring that the description more effectively communicates the technical aspects of the invention and aids in delineating the claimed invention from prior art.

[15] Original: In the second case, one may sample the brightest point in the local area of the lane signal and set a pixel threshold to acquire the pixel histogram of a lane signal to get the identical test parameters of the lane signal
Modified: Here, the sampling process may involve selecting the brightest point within the local area and setting threshold nearby for background removal
Reason for Modification: To streamline and clarify the language used in the description of the image processing technique involved in analyzing hlane and level signals. The original sentence, though descriptive, was unnecessarily verbose and could lead to confusion regarding the primary purpose of the threshold setting, which is to facilitate the removal of background noise from the image data. By simplifying the language to "set threshold nearby for background removal," the modification narrows the focus to the essential action and outcome, enhancing readability and emphasizing the threshold's role in improving signal clarity by excluding irrelevant or background pixel data.

[16] Original: of the
Modified:
Reason for Modification: To correct a grammatical error and improve the clarity of the sentence.
[17] Original: with either the same start state or the same end state
Modified: that share either the same start or end state
Reason for Modification: To streamlines the language, reducing redundancy without altering the technical content. The new phrase is more direct and efficient, enabling easier understanding and emphasizing the critical aspect of commonality between states in a briefer manner.
[18] Original: to gain a mean and a standard deviation
Modified: to determine the mean and standard deviation
Reason for Modification: To enhance the technical precision and appropriateness of the language used in the description. This change clarifies that the process involves analytical methods to accurately calculate the mean and standard deviation, rather than merely gaining them, which could imply a less structured approach. The revised phrasing aligns better with the scientific standards of measurement and data analysis, enhancing the overall clarity and professionalism of the document.
[19] Original: with the sampling point close to the end of a level, so only two short line segments of the level mean are drawn
Modified: varies depending on the proximity to the end of a level, resulting in only two short line segments being depicted for the level mean, as shown
Reason for Modification: To enhance clarity and precision in the description of the phenomenon. The new phrasing more directly and clearly communicates that the level mean is not static and is affected by the position of the sampling point relative to the level's end, reducing ambiguity about the nature of the level mean's variability. Additionally, it clarifies the outcome of the variability in a more passive and precise manner. This change shifts the focus from the act of drawing to the consequence of the measurement conditions, emphasizing the result in the visual representation.
[20] Original: FIG. 5 illustrates a flow chart of an exemplary method for the jitter measurement of a level histogram on the 1UI PAMn image, in accordance with an embodiment of the present invention. In a step 510 of method 500, one may sample the single-lane signal at (x0, y0) in the middle of a level and then acquire the lane histogram on the y0 axis if the level is either the top or bottom one or set a pixel threshold to acquire the lane histogram if the level is others, in a step 520 of method 500. By fitting gaussian to the lane histogram, one may obtain the jitter parameters, the lane mean $\mu_0$, and the lane width $\sigma_0$ in a step 530 of method 500. Next, one may sample the mixed-lane or level signal at (x1, y1) close to either side of the level in a step 540 of method 500 to acquire the level histogram on the y1 axis in a step 550 of method 500. After fitting gaussian to the level histogram, one may get the level mean pi and the level width 61 in a step 560 of method 500. Finally, one may determine the jitter components of the level histogram in that the random jitter is the level width, RJ=$\sigma_1$, and the deterministic jitter is the mean shift of the level mean against the lane mean, DJ=$\mu_1$-$\mu_0$, in a step 570 of method 500

Modified: FIG. 5 illustrates a flow chart of an exemplary method for jitter measurement of a level histogram on the 1UI PAMn image, in accordance with an embodiment of the present invention. The process begins at Step 510 of Method 500 by selecting a sampling point for the horizontal lane (hlane) signal, strategically located at the midpoint of the level within the 1UI PAM-n pattern. This initial step is critical as it sets the reference point for measuring the inherent jitter in the level's signal. Following this, in Step 520, pixel values are acquired along the vertical axis at the chosen sampling point to construct the hlane histogram. This histogram captures the distribution of pixel intensity values across the hlane, providing a fundamental dataset for further statistical analysis. The hlane histogram is then subjected to Gaussian fitting in Step 530, which facilitates the determination of its mean ($\mu_0$) and standard deviation ($\sigma_0$), offering insights into the variability of the hlane signal. Subsequently, in Step 540, a sampling point for the level signal is selected, typically positioned close to one end of the level. This choice is aimed at capturing the variations in the level signal along the central axis of the open eyes against a clean background, which is essential for a comprehensive jitter assessment. At this new sampling point, pixel values along the vertical axis are collected to form the level histogram in Step 550.
Reason for Modification: To enhance the clarity and specificity of the jitter measurement methodology described in the flowchart for a 1UI PAMn image. The original paragraph, while detailed, included some ambiguities regarding the distinction between different types of lane signals and their processing. The modified paragraph simplifies and clarifies these steps, focusing on the sampling and analysis of the "hlane signal" specifically, which is more precisely defined and aligned with the procedures necessary for accurate jitter assessment. This updated description eliminates fewer clear references to "single-lane" and "mixed-lane" signals and instead emphasizes a structured approach to analyzing both "hlane" and "level" signals systematically. Each step from sampling to Gaussian fitting is now explicitly tied to either the hlane or the level histogram, ensuring that the reader can follow the logical progression of the method without confusion. Moreover, the modification introduces a consistent use of technical terms and integrates a step-by-step explanation that aligns with best practices in technical documentation for patent applications. The refinement facilitates a clearer understanding of how jitter parameters are determined, including the specific means and standard deviations, and how these relate to the calculation of deterministic and random jitter. This not only improves the readability and instructional quality of the patent document but also ensures that the patent's claims are supported by a precise and comprehensible description of the patented technology.
[21] Original: FIG. 6 illustrates an example of explaining the algorithm using the partition of sums of squares in ANOVA to determine the jitter components, RJ, DJ, and TJ of a level histogram. The image on the left is the lower right corner of the 1UI PAM4 image, in which there are four transition lanes, a hlane 00 and three tlane, 10, 20, and 30. The four histograms, a, b, c, and d, on the right of the image are from four corresponding vertical slots on the image. The histogram a may contain only the lane signal, and three histograms, b, c, and d, are the level signals mixed by the four transition lanes.

Modified: FIG. 6 presents a corner image of the 1UI PAM4 pattern, specifically targeting the lower right corner to showcase the mean shift across different sampling positions within a level histogram, a crucial aspect in the analysis of deterministic jitter (DJ). This particular segment of the 1UI PAM4 pattern features four transition lanes: a horizontal lane (hlane 00) and three inter-level transition lanes (tlane 10, 20, and 30). Directly to the right of the image, four histograms labeled a, b, c, and d correlate to vertical slots within the image. Histogram a only captures the hlane signal, while histograms b, c, and d represent the level signals, which are combinations of the four transition lanes. This configuration illustrates how the trends in the level histograms tend to converge with or closely align with the hlane mean towards the ends of the level, highlighting the dynamic interaction between these signal components [21].

Reason for Modification: To provide a technical description using the ANOVA framework to determine jitter components but lacked clarity in visually describing how the data correlates to the jitter analysis in the imagery provided. The revised paragraph refines the explanation to focus on illustrating the mean shift across different sampling positions within a level histogram, emphasizing its critical role in analyzing deterministic jitter (DJ). This adjustment not only streamlines the technical narrative but also enhances the educational value of the figure by clearly linking the visual elements (histograms and level signals) to the concepts of jitter analysis. Additionally, the modified text clarifies the roles of each histogram, distinguishing between the hlane signal and the mixed level signals, thereby providing a clearer understanding of how these components interact within the 1UI PAM4 pattern. This clarity in description helps in illustrating the practical application of the theory, making the patent's explanations more accessible and relevant to practitioners and examiners alike. By focusing on the interaction between signal components and their contribution to jitter analysis, the paragraph becomes more illustrative of the dynamic processes involved, thereby enhancing the overall comprehensibility and applicative value of the patent document.

[22] Original: A level histogram in the 1UI PAMn image may be a typical statistical system in which the pixel value of signals in each transition lanes is a dependent variable approximately normally distributed, and the transition lanes are categorical and independent groups. Therefore, three jitter components, RJ, DJ, and TJ, of the level histogram may be determined with mathematical formulas of the partition of sums of squares in ANOVA, RJ=sum of squares within (or Errors), DJ=sum of squares between (or Treatment), and TJ=sum of squares total.

Modified: A level histogram in the 1UI PAM-n image can be viewed as a mixed system where each transition lane is treated as an independent component exhibiting approximately Gaussian distributions. In this analytical context, the three primary jitter components-Random Jitter (RJ), Deterministic Jitter (DJ), and Total Jitter (TJ)—can be accurately quantified using mathematical formulas derived from the partitioning of sums of squares in one-way ANOVA. Specifically, RJ is calculated as the sum of squares within groups (or Error), DJ as the sum of squares between groups (or Treatment), and TJ as the total sum of squares. This structured analytical framework aids in dissecting the variations both within and between the levels of the histogram, thereby providing a detailed and comprehensive measure of jitter [22].

Reason for Modification: To clarify and refine the explanation of how jitter components are quantified within a level histogram of a 1UI PAM-n image. The revised paragraph enhances understanding by replacing the more general term "typical statistical system" with "mixed system," which more accurately reflects the statistical nature of the analysis involving independent components exhibiting Gaussian distributions. This change improves technical accuracy and specificity. Furthermore, the description of the jitter components—RJ, DJ, and TJ—and their calculation is streamlined to provide clearer, more direct connections to the methods used in one-way ANOVA. The modification specifies each type of sum of squares involved, directly linking them to their respective jitter components and explaining their roles within the context of the analysis. This not only helps in making the statistical methods more transparent but also facilitates a better understanding of how these components contribute to the overall jitter measurement. By articulating these concepts more clearly, the revised paragraph ensures that the methodology is comprehensible and effectively communicates the sophisticated analysis involved in jitter measurement. This level of detail and clarity supports the precision required in patent documentation, ensuring that the methods described are both reproducible and verifiable, which is essential for the validation of the patent claims.

[23] Original: A level histogram containing the signals of all transition lanes is the total jitter TJ of a level at the sampling point. The mean and width of the level histogram vary with the sampling point, and the level width may reach the minimum when the sample point closes to one of the ends of the level, as shown in FIG. 6, similar to the crossing point on the NRZ eye diagram.

Modified: A level histogram captures the signals from all transition lanes at a specific sampling point within a level. The mean and width of this histogram vary significantly with the location of the sampling point. In a 1UI PAMn pattern, the width of the level histogram typically reaches its minimum near one end of the level, as illustrated in FIG. 6. This approach mirrors the conventional technique used for sampling the horizontal histogram at its minimal crossing point in the NRZ eye diagram, a method essential for precise jitter analysis of NRZ eye diagrams.

Reason for Modification: To enhance clarity and precision in describing how a level histogram captures and reflects jitter characteristics. The original text used more generalized language, which might lead to ambiguity about the nature of the histogram and its relationship to jitter measurement. The revision aims to precisely define the level histogram's function, specifying that it includes signals from all transition lanes at a particular sampling point, which better contextualizes the importance of the sampling location. Additionally, the mention of the "1UI PAMn pattern" in the modified paragraph clarifies the specific context within which these observations are made, further enhancing the technical accuracy of the description. Moreover, the revised paragraph explicitly compares the sampling technique to a well-understood method used in NRZ eye diagrams, thereby making the explanation more accessible to those familiar with similar technologies. This comparison is not only illustrative but also reinforces the relevance and applicability of the method for accurate jitter analysis. By detailing that the method is crucial for precise jitter analysis in NRZ diagrams, the modification strengthens the connection between the depicted technique and its practical implications, thus providing a more comprehensive and technically sound description that aligns with industry practices.

[24] Original: The total jitter, TJ=RJ+DJ and DJ≥0. In a particular case without dispersion in the level histogram, all transition lanes, a hlane and other tlanes are symmetrical overlaps on each other around the level mean at the sampling point, so that DJ=0, and TJ=RJ, which is the minimum of TJ.

Modified: Total jitter (TJ) is the sum of random jitter (RJ) and deterministic jitter (DJ), defined by the equation TJ=RJ+DJ, with DJ being non-negative (DJ≥0). In scenarios where there is no Intersymbol Interference (ISI) and other dispersions, such as when all transition lanes, including a horizontal lane (hlane) and other transition lanes (tlanes), symmetrically overlap around the level mean within the level histogram, DJ equals zero (DJ=0). Consequently, TJ is equal to RJ, representing the minimum possible value of TJ.

Reason for Modification: To enhance the technical accuracy and clarity of the description regarding how total jitter (TJ) is calculated and the conditions under which deterministic jitter (DJ) is minimized. The original text described a specific scenario using less precise terminology and without explicitly mentioning common technical terms like Intersymbol Interference (ISI), which are crucial for a correct understanding in the context of digital signal processing. The revised text introduces the concept of DJ being non-negative, which aligns with standard definitions in jitter analysis. By specifying the condition of "no Intersymbol Interference (ISI) and other dispersions," the modification directly addresses a common cause of signal variation and clarifies that DJ can indeed be zero under idealized conditions of perfect signal overlap. This change not only refines the language to be more technically precise but also helps in making the explanation more accessible and understandable to those familiar with signal processing, thus enhancing the document's utility and educational value.

[25] Original: In addition, the lane mean of an ideal level on the 1UI PAMn image may remain constant, indicating that the lane mean is independent of the sampling point. Therefore, the lane mean $\mu_0$ of a level may be defined as the reference line, and the mean shift Δ of the level mean against the lane mean may be used as a variable to measure DJ, i.e., DJ=Δ.

Modified: In the 1UI PAM-n pattern, the horizontal lane mean ($\mu_0$) typically remains constant, indicating that it does not vary based on the sampling point along the level. Therefore, the hlane mean ($\mu_0$) functions as a reference line for measuring the mean shift (Δ) from the level mean ($\mu$). This mean shift, A, is significant as it is independent of the random jitter within the mixed-signal system, and is solely associated with deterministic jitter. Consequently, the mean shift (Δ) is employed as a key metric to quantify DJ.

Reason for Modification: To provide greater specificity and clarity regarding the stability of the hlane mean ($\mu_0$) in a 1UI PAM-n pattern and its role in jitter analysis. The revised text emphasizes that the hlane mean remains constant and is unaffected by the sampling point, reinforcing its suitability as a stable reference line for jitter analysis. By defining the mean shift (Δ) specifically in relation to the hlane mean, the modification makes it clear that this metric is used exclusively to measure deterministic jitter (DJ), isolating it from influences of random jitter within the mixed-signal system. This clarification enhances the methodological rigor of the description, making the approach to measuring DJ more precise and replicable. The update serves to better align the patent description with technical standards and provides a clearer explanation of how DJ is quantified, ensuring that the method is both theoretically sound and practically applicable. This level of detail is crucial for the patent's utility and enforceability, as it defines the technical terms and measurement techniques with greater accuracy and specificity.

[26] Original: The statistical model and algorithm of jitter measurement may apply to different sampling points on either the x or y axes of the 1UI PAMn image. In a generic case of the level histogram's profile containing more than one peak in shape, the system may fit more Gaussians to the pixel profile. If the number of peaks on the pixel profile is n, the random jitter of a level histogram, or the total level width, may be the square root of sum of squares of widths, $$RJ = \sqrt{\sigma_1^2 + \sigma_2^2 + \ldots + \sigma_n^2}$$

where $\sigma_i$ is the width of the peak i. The deterministic jitter of a level histogram, or the total mean shift, may be the square root of sum of squares of the mean shifts, $$DJ = \sqrt{\Delta_1^2 + \Delta_2^2 + \ldots + \Delta_n^2}$$

where $\Delta_i = \mu_i - \mu_0$ is the mean shift of the peak i against the reference line or the lane mean $\mu_0$.

Figure 7:
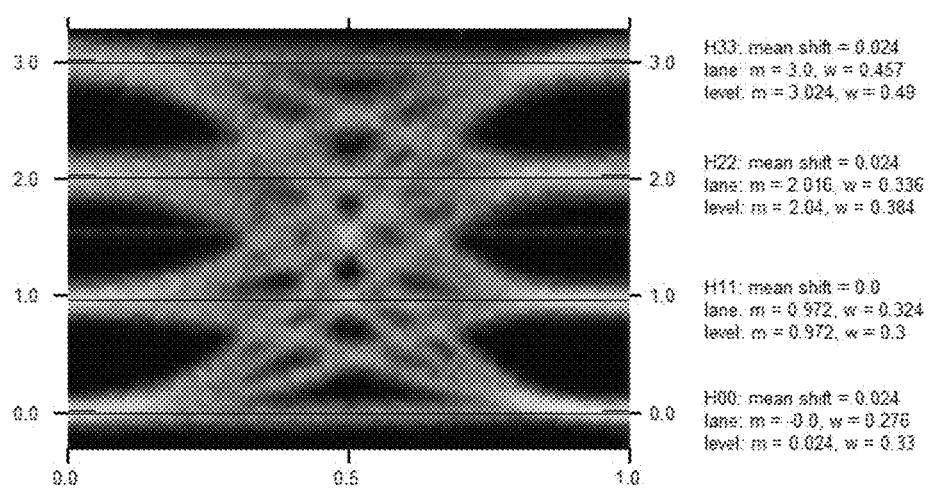
FIG. 7 illustrates an example of reporting the jitter testing parameters, including the mean and mean shift associated with Deterministic Jitter (DJ), the standard deviation corresponding to Random Jitter (RJ) [8].

FIG. 7 illustrates an example of reporting jitter measurements of four levels in a PAM4 image. The test parameters of a jitter measurement include a lane mean and a lane width, a level mean and a level width, and the mean shift. One can further give the jitter components of a level that RJ is the level width and DJ is the mean shift.

Modified: The jitter measurement method described in this invention utilizes five key testing parameters. These include three parameters related to deterministic jitter, the hlane mean, the level mean, and the mean shift, and two parameters associated with random jitter, the hlane width and the level width, depicted in the FIG. 7. This comprehensive methodology provides effective insights into evaluating the impact of both deterministic factors and random jitter on total jitter. By systematically integrating these parameters, this approach significantly enhances the clarity and precision of jitter analysis within the PAMn eye diagram, offering a novel methodology to study and comprehend the complex dynamics affecting signal integrity for high-speed serial communication systems.

Reason for Modification: The original paragraph provided a general overview of the statistical model and algorithm used for jitter measurement, discussing how it applies across different sampling points and describes the calculation of random and deterministic jitter based on Gaussian fits and mean shifts. However, this description was somewhat abstract and lacked specific detail about the practical application of these concepts within the context of the patent's technology.

The modified paragraph shifts focus to clarify and specify the jitter measurement method as it relates to the invention, delineating the five key testing parameters used in the methodology. This shift was necessary to align the description more closely with the practical implementation of the jitter measurement method as it is applied in the 1UI PAMn image analysis, especially in high-speed serial communication systems. The revised text underscores the role of each parameter (hlane mean, level mean, mean shift, hlane width, and level width) in assessing both deterministic and random jitter, enhancing the understanding of their impact on total jitter.

By detailing these parameters and their relevance to jitter analysis, the modification not only improves the precision and applicability of the description but also enhances its educational value for readers. This ensures that the methodology is clearly understood and demonstrates its novelty and effectiveness in tackling the complexities of signal integrity analysis. The inclusion of a specific figure (FIG. 7) in the new paragraph also helps in visualizing the concepts discussed, further enhancing the clarity and utility of the patent documentation. This comprehensive approach offers a more direct and actionable insight into the jitter analysis, significantly contributing to the technical depth and clarity of the patent application.

[27] Original: Notably, the system integrating the statistical model, algorithm, and image processing method may be a generic solution for the jitter measurement of amplitude-modulated signaling of electromagnetic waves in different frequencies and baud rates.

Modified: The system, which integrates the statistical model, algorithm, and image processing method, represents a versatile solution for jitter measurement in amplitude-modulated signaling across various frequencies and baud rates.

[28] Reason for Modification: The modification was made to enhance the clarity and conciseness of the description of the system's capabilities in jitter measurement for amplitude-modulated signaling. The original sentence was slightly redundant with the use of "Notably, the system," which could lead to confusion. The revised version corrects this redundancy by streamlining the sentence structure, making it more direct and easier to read.

Additionally, the term "generic solution" in the original sentence was replaced with "versatile solution" in the modified version to better convey the adaptability and broad applicability of the system across different operational contexts. This change highlights the system's capability to effectively handle a wide range of frequencies and baud rates, enhancing the perceived utility and innovativeness of the invention. The revision ensures that the description is not only more grammatically sound but also emphasizes the system's strengths and technical versatility in a clear and professional manner, aligning with the overall narrative of the patent document.

The invention claimed is:

1. A method comprising the steps for:
   importing a photo or a digital file of a multi-level Pulse Amplitude Modulation (PAMn) eye diagram captured from a digital sampling oscilloscope;
   editing the PAMn eye diagram from a configuration with 2UI (unit interval) or multiple UI to a 1UI PAMn pattern using a specifically defined image processing algorithm;
   reconfiguring the pixel size and scale of the 1UI PAMn pattern for jitter measurement;
   performing jitter measurements to determine jitter testing parameters, including the level mean and level mean shift associated with Deterministic Jitter (DJ), and a level width (standard deviation) corresponding to Random Jitter (RJ), for a level histogram within the 1UI PAMn pattern;
   reporting the jitter parameters, including the level mean and level mean shift, the level width, and their contribution to Total Jitter (TJ), for the PAMn level histogram.

2. The method of claim 1, wherein the steps of editing the PAMn eye diagram to a 1UI PAMn pattern comprises:
   sampling two points, (x1, y1) and (x2, y2), on a horizontal line of the PAMn eye diagram, where both points exhibit the same local pattern and x1<x2;
   sampling a third point (x3, y3) at the eye center in the PAMn eye diagram, where x1<x3<x2;
   converting the color image of the PAMn eye diagram into a grayscale image using image processing techniques;
   vertically cropping the eye diagram into two parts: the first part (img1) from x1 to x3, and the second part (img2) extending from x3 to x2;
   recombining the two cropped images in reverse order, such that img3 is created by placing img2 before img1, forming the 1UI PAMn image.

3. The method of claim 1, wherein the step of performing jitter measurement to determine litter testing parameters for a level histogram comprises:
   selecting a sampling point for the horizontal lane (hlane) signal at the midpoint of the level within the 1UI PAMn pattern;
   acquiring histogram for the hlane signal on the vertical axis at the selected sampling point;
   fitting a Gaussian distribution to the hlane histogram to determine the hlane mean ($\mu_0$) and hlane width ($\sigma_0$), where the width corresponds to the standard deviation of the distribution;
   selecting a sampling point for the level signal near one end of the level;

acquiring a histogram of the level signal on the vertical axis at the selected sampling point;

fitting Gaussian distribution to the level histogram to determine its mean ($\mu$) and width ($\sigma$), where the width also corresponds to the standard deviation of the distribution;

calculating the mean shift ($\Delta$), defined as the difference between the mean of the level histogram ($\mu$) and the mean of the hlane histogram ($\mu_o$), to assess characteristics of deterministic jitter (DJ) of the level histogram.

\* \* \* \* \*